United States Patent Office 3,574,187
Patented Apr. 6, 1971

3,574,187
PROCESS FOR MAKING ALKYL 7-O-ALKYL-1-THIO-α-LINCOSAMINIDES AND PRODUCTS THEREOF
Brian Bannister, Kalamazoo, Mich., assignor to The Upjohn Company, Kalamazoo, Mich.
No Drawing. Filed Nov. 3, 1969, Ser. No. 873,717
Int. Cl. C07c 47/18
U.S. Cl. 260—210    4 Claims

ABSTRACT OF THE DISCLOSURE

Alkyl 7-O-alkyl-1-thio-α-lincosaminides useful as intermediates for preparing antibacterially active 7-O-alkyl-lincomycins are prepared by converting 2'-hydroxyethyl 7-O-methyl-1-thio-α-lincosaminide to the corresponding 1-bromo sugar then replacing the bromo group by an alkyl mercapto group while the 2-, 3-, and 4-hydroxyl groups and the 6-amino group are covered by protective groups, and then removing the protective groups; or by acylating an alkyl 6-N,7-O-ethylidyne-3,4-O-isopropylidene-1-thio-α-lincosaminide to form the 2-acylate thereof, hydrolyzing the 6-N,7-O-ethylidyne grouping to form alkyl 2-O-acyl-6-N-acetyl-3,4-O-isopropylidene-1-thio-α-thiolincosaminide, alkylating the 7-hydroxy group to form alkyl N-acetyl-7-O-alkyl-1-thio-α-lincosaminide, and removing the N-acetyl group by hydrazinolysis and the 3,4-isopropylidene group by hydrolysis to form the desired alkyl 7-O-alkyl-1-thio-α-lincosaminide.

BRIEF DESCRIPTION OF THE INVENTION

The invention relates to processes for making novel alkyl 7-O-alkyl-1-thio-α-lincosaminides of the formula

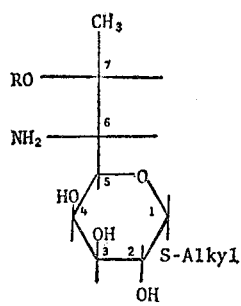

(I)

wherein R and alkyl are alkyl of not more than 4 carbon atoms, for example, methyl, ethyl, propyl, isopropyl, butyl, sec.-butyl, isobutyl, and tert.-butyl and to certain 7-O-alkyl-lincomycins derived therefrom.

The compounds of Formula I are obtained in two different ways. The first (Process A) produces compounds where R is methyl and the second (Process B) produces compounds where R is methyl or other lower alkyl. In accordance with Process A, compounds of Formula I where R is methyl are obtained by reacting 2'-hydroxyethyl 7-O-methyl-1-thio-α-lincosaminide pentaacetate, or an otherwise protected 2'-hydroxyethyl 7-O-methyl-1-thio-α-lincosaminide of the formula

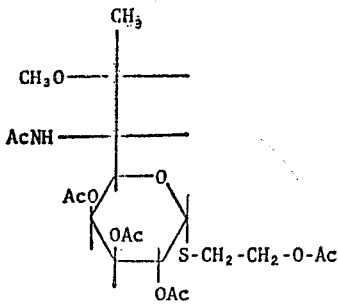

(II)

wherein Ac is a protective carboxacyl group suitably acetyl or other lower alkanoyl group, for example, propionyl, butyryl, valeryl, hexanoyl, heptanoyl, octanoyl and the isomeric forms thereof, with bromine in an inert nonaqueous solvent, for example chloroform, methylene chloride or carbon tetrachloride and treating the resulting 7-O-methyl-1-bromo-lincosamine tetraacylate of the formula

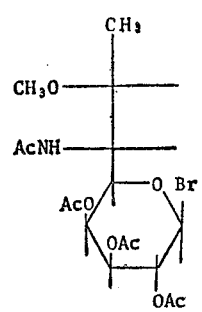

(III)

to replace the bromine by an alkyl mercapto group and then removing the protective groups.

In accordance with Process B, compounds of Formula I wherein R is methyl or other lower alkyl are obtained as follows. An alkyl 6-N,7-O-oxazoline form of 2-O-acyl-3,4-O-isopropylidene-1-thio-α-lincosaminide of the formula

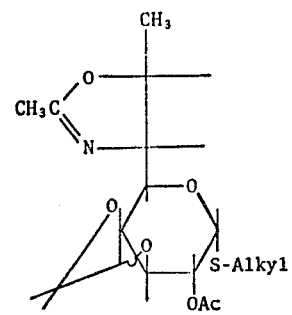

(IV)

wherein Ac and Alkyl are as given above is subjected to uncatalyzed hydrolysis to open the oxazoline ring and to form an alkyl N-acetyl-2-O-acyl-3,4-O-isopropylidene-1-thio-α-lincosaminide of the formula

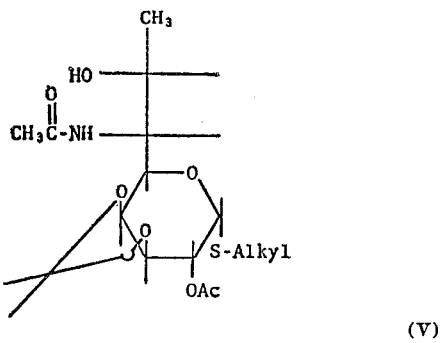

(V)

This compound is then alkylated to form an alkyl N-acetyl-2-O-acyl-7-O-alkyl - 3,4 - O - isopropylidene-1-thio-α-lincosaminide of the formula

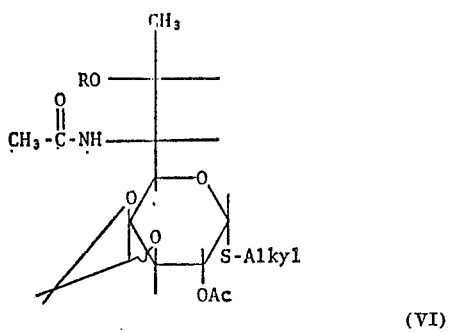

(VI)

The acetyl, acyl, and isopropyidine groups are then removed to form the desired compound of Formula I. The acetyl group is removed by hydrazinolysis, which also removes the acyl group. The isopropylidene group is removed by acid hydrolysis, which can also remove the acyl group. Thus if hydrazinolysis is first and acid hydrolysis is second, the hydrazinolysis yields an alkyl 3,4-O-1-isopropylidine-7-O-alkyl-1-thio-α-lincosaminide of the formula

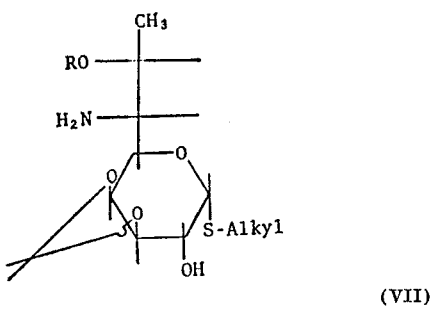

(VII)

and the hydrolysis, a compound of Formula I. If the acid hydrolysis is first and hydrazinolysis is second, the hydrolysis yields an alkyl N-acetyl-7-O-alkyl-1-thio-α-lincosaminide of the formula

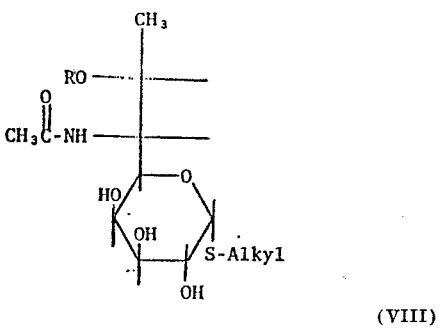

(VIII)

and the hydrazinolysis, a compound of Formula I.

DETAILED DESCRIPTION OF THE INVENTION

The starting compounds of Formulas II and IV are prepared respectively by the acylation of (1) 2'-hydroxyethyl 7-O-methyl-1-thio-α-lincosaminide (Example 3 of U.S. Pat. 3,208,996) and (2) alkyl 6-N,7-O-ethylidyne-3,4-O-isopropylidene-1-thio - α - lincosaminide (U.S. Pat. 3,337,527). The acylation can be effected in a manner already well known in the art, for example, by reaction with the appropriate acid halide or anhydride in the presence of an acid binding agent such as pyridine, trimethylamine, and the like, with or without the use of an inert solvent such as dioxan, chloroform or dimethylformamide.

PROCESS A

The pentaacetate of Formula II is treated with bromine in an inert solvent, for example, chloroform, methylene chloride, or carbon tetrachloride to form a compound of Formula III. The reaction takes place spontaneously at room temperature, although lower or higher temperatures can be used if desired.

The replacement of the bromine is effected by reacting the compound of Formula III with thiourea in solution in a tertiary amide dipolar aprotic solvent, for example, hexamethyl phosphoric triamide, dimethylformamide, N-methyl-2-pyrrolidone and the like, to form an isothiouronium salt of the formula

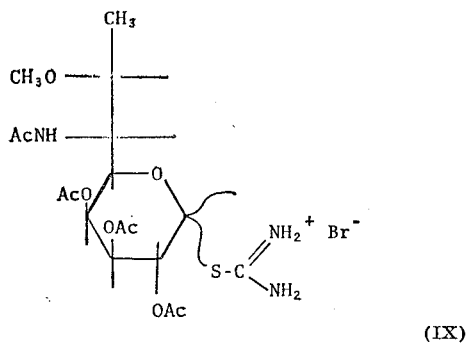

(IX)

This isothiouronium salt is then subjected to mild basic hydrolysis and at the same time the thiose thus freed is alkylated to form the desired alkyl thioglycoside. Advantageously, there may be included an antioxidant such as sodium bisulfite, sodium hydrosulfite ($Na_2S_2O_4$), and sodium pyrosulfite (sodium metabisulfite ($Na_2S_2O_5$), to prevent oxidation to the disulfide or to reduce any disulfide formed. Alkyl iodide advantageously is used as the alkylating agent. Other alkylating agents, however, can be used, for example, dialkyl sulfate, and alkyl p-toluenesulfonate. The alkylation advantageously is effected concomitantly with the hydrolysis of the isothiouronium salt in order to minimize undesired reactions of the thiose. Also the mild water-soluble base, for example, alkali metal carbonate, used in the hydrolysis has a favorable effect on the alkylation; it has a tendency to make the proton of the SH group more labile and also acts as an acid acceptor. The isothiouronium salt can be separated from the reaction mixture if desired prior to the hydrolysis and alkylation but ordinarily this is not necessary and it is sufficient simply to dilute the solution of the isothiouronium salt in the dipolar aprotic solvent with water and add the base and the alkylating agent, and if desired the antioxidant, while effecting whatever cooling may be necessary. To dissipate the exotherm, ordinarily the solution in the dipolar aprotic solvent is cooled in an ice-bath and the water and other reagents added with stirring while the reaction mixture is maintained in the ice-bath. After the initial exotherm is dissipated the cooling bath may be removed.

The use of a tertiary amide dipolar aprotic solvent is an important aspect of the invention as other types of solvents such as acetone and chloroform yield exclusively the beta-anomer. The tertiary amide dipolar aprotic solvents, however, give reaction mixtures containing substantial quantities of the alpha-anomer and by the use of such tertiary amide dipolar aprotic solvents as hexamethylphosphoric triamide ratios of alpha- to beta-anomers of 1:2 or more can be obtained.

The alpha- and beta-anomers can be separated by methods already known in the art as for example, liquid-liquid fractionations such as counter-current distribution or partition-chromatography. If desired, the separation of the alpha and beta-anomers can be effected at the isothiouronium salt stage before the alkaline hydrolysis but advantageously it is carried out after the alkylation step. This is desirable because it is possible that the isolation steps will result in some equilibration of anomers.

The protective acyl groups can readily be removed by hydrazinolysis in the manner already known in the art. See for example U.S. 3,179,565.

PROCESS B

The success of Process B depends upon the discovery that the oxazoline ring can be opened without affecting the 2-O-acyl protective group, by uncatalyzed hydrolysis, i.e., by using water (pH ca 7) without the addition of acid or base. It is sufficient simply to add water, for example, to the reaction mixture of the acylation step, and gently heat as on a steam bath.

The alkylation step is effected in a manner already well known in the art. For example, by means of methyl, or other lower alkyl iodide with an acceptor for hydrogen iodide, for example, silver oxide, silver carbonate, barium oxide, and barium carbonate. An excess of the iodide can be used as a solvent. If desired, however, the reaction can be carried out in another inert solvent, such as ether, tetrahydrofuran, and dioxan. Gentle heating can be used up to say about 60° C. to accelerate the alkylation.

The N-acetyl group is removed in the same way as it is removed in Process A. If the 2-O-acyl group has not been previously removed it will be removed at the same time.

The 3,4-O-isopropylidene group is removed by acid hydrolysis. It is sufficient simply to contact the acetonide wtih a dilute hydrochloric acid solution without heating. If desired, gentle heating as on a steam bath can be used. If the 2-O-acyl group has not been previously removed it also will be removed by the acid hydrolysis.

The resulting compounds (Formula I) can now be converted to 7-O-alkyl-lincomycins by acylation with trans-1-methyl-4-propyl-L-2-pyrrolidinecarboxylic acid or to analogs thereof by the choice of the appropriate L-2-pyrrolidinecarboxylic acid in the manner already known in the art. See for example U.S. Pat. 3,380,992. The resulting 7-O-alkyl-lincomycins and analogs thereof are useful for the same purpose as lincomycin and its analogs and can be utilized in the same way, taking into account any greater activity of the 7-O-alkyl compounds. Thus, 7-O-methyl-lincomycin is about twice as active as lincomycin and can accordingly be used in correspondingly smaller doses.

The invention may be more fully understood by reference to the following example in which the parts are by weight unless otherwise specified.

EXAMPLE I

Part A.—2'-hydroxyethyl N-acetyl-2',2,3,4-tetra-O-acetyl-7-O-methyl 1-thio-α-lincosaminide

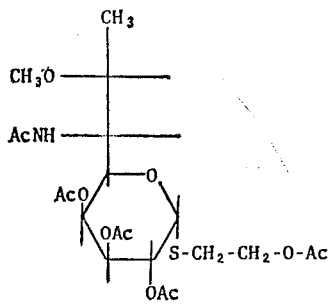

(II)

2'-hydroxyethyl 1 - thio - α - celestosaminide (1.0 gm.) (Example 3 of U.S. Pat. 3,255,174) was left overnight in solution in pyridine (25 ccs.) and acetic anhydride (12 ccs.). Removal of the solvent in vacuo gave a colorless oil which was dissolved in chloroform, washed with water, dilute aqueous hydrochloric acid, water, saturated aqueous sodium bicarbonate, water and dried over anhydrous sodium sulfate. Solvent removal in vacuo gave a syrup (2.03 gms.) which an crystallization from ethyl acetate-Skellysolve B yielded 2'-hydroxyethyl N-acetyl-2',2,3,4-tetra - O - acetyl-7-O-methyl-1-thio-α-lincosaminide (Formula II) in squat, colorless prisms, M.P. 143–144° C. Skellysolve B is a brand of technical hexane.

Analysis.—Calcd. for $C_{21}H_{33}O_{11}NS$ (percent): C, 49.68; H, 6.54; N, 2.76; S, 6.32. Found (percent): C, 49.66; H, 6.50; N, 2.91 S, 6.34.

$[\alpha]_D$: $+216°$ (c., 0.7746, $CHCl_3$).

Part B.—Methyl N-acetyl-2,3,4-tri-O-acetyl-7-O-methyl-1-thio-α and -β-lincosaminides

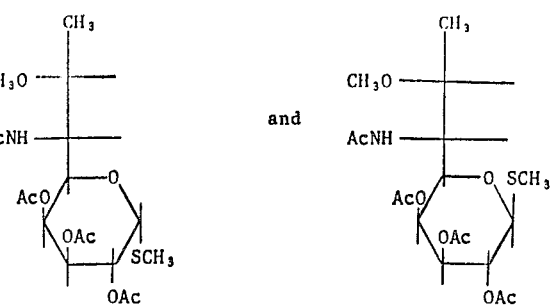

A solution of 5.05 gms. (1.62 ccs.) of bromine in 100 ccs. of chloroform was added over approximately 30 minutes from a pressure-equalized dropping funnel under anhydrous conditions to a stirred solution of 10 gms. of 2' - hydroxyethyl N-acetyl-2',2,3,4-tetra-O-acetyl-1-thio-α-celestosaminide prepared by the procedure of part A in 200 ccs. of chloroform. Initially, the bromine color disappeared immediately; later, a deep orange-red color developed. After stirring for an additional 30 minutes at room temperature, solvent was removed on a rotating evaporator at 40° C./7 mm., giving a yellow-orange syrupy residue. This was redissolved in chloroform, the solvent removed in vacuo, and the process repeated till the distillate became colorless, leaving a yellowish amorphous residue of 1-bromo-7-O-methyl-β-lincosamine tetraacetate of the formula

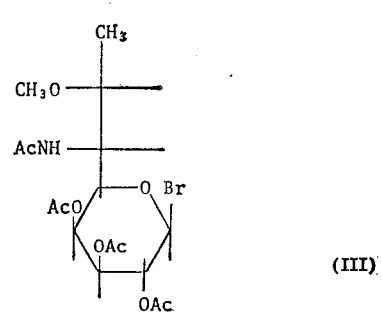

(III)

The residue was dissolved in 200 ccs. of dry dimethylformamide, 4.5 gms. of thiourea was added, and the reaction mixture (a colorless solution) stirred overnight at room temperature. There were thus formed the isothiouronium salts of the formulas

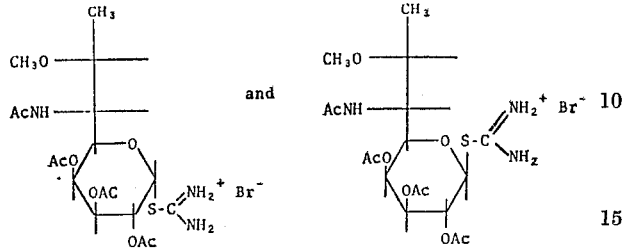

Without isolating these salts and after cooling in an ice-bath, 100 ccs. of water was added slowly, followed by 8.3 gms. of anhydrous potassium carbonate, 10.6 gms. of sodium bisulfite, and 28 gms. (12.3 ccs.) of methyl iodide. The mixture was stirred vigorously magnetically for 3 hours, the cooling bath being removed after 20 minutes.

Volatile materials were removed in vacuo at 40° C., and finally at 80° C./<1 mm. The yellow residue was dissolved in a mixture of chloroform and water, the aqueous layer extracted with chloroform, and the combined chloroform extracts were washed twice with water and dried over anhydrous sodium sulfate. Removal of the solvent in vacuo gave a colorless amorphous residue (6.48 gms.). Thin-layer chromatography (1 acetone:1 Skellysolve B) showed a major zone of product with a small zone of slightly higher $R_f$.

This material was chromatographed on silica gel (1.2 kilos, column dimensions 5.8 x 90 cms.) in the system 1 acetone:1.5 Skellysolve B. After a 500 cc. forerun, 50 cc. fractions were collected automatically, and elution of materials followed by thin-layer chromatography. Fractions Nos. 145–173, inclusive, corresponded to the material of higher $R_f$, Nos. 185–310, inclusive, corresponded to the major product, and Nos. 174–184, inclusive, were a mixture of the two.

Removal of solvent in vacuo from combined fractions 145–173, inclusive, gave a colorless syrup (570 mgms.), which on crystallization from ethyl acetate-Skellysolve B yielded methyl N-acetyl-2,3,4-tri-O-acetyl-7-O-methyl-1-thio-α-lincosaminide in small colorless prisms, M.P. 212–213° C. undepressed on a mixture with the sample Example II part C of M.P. 211.5–213°, and also indistinguishable from it by infrared, nuclear magnetic resonance, and mass spectra, and also by optical rotation.

Removal of solvent in vacuo from combined fractions 185–310, inclusive, gave a slightly yellow amorphous solid (4.23 gms.), which on crystallization yielded methyl N-acetyl-2,3,4-tri-O-acetyl-7-O-methyl-1-thio-β-lincosaminide in colorless prisms, M.P. 187–188° C.

*Analysis.*—Calcd. for $C_{18}H_{29}O_9NS$ (percent): C, 49.64; H, 6.71; N, 3.22; S, 7.36; MeO, 7.13. M.W. 435.49. Found (percent): C, 49.73; H, 6.95; N, 3.18 S, 7.64; MeO, 7.41.

$[α]_D$: +24° (c., 0.7484, $CHCl_3$). M. wt.: (mass spec., M+) 435.

The overall yield of introduction of the —SMe group (i.e. α- +β-anomers) was 49.2% (6.7% α, 42.5% β) with the α/β ratio 1:6.35.

The β-anomer can be recycled to part B and thus enhance the overall yield of the more desired α-anomer.

Part C

The procedure of Part B was repeated substituting the methylformamide by hexamethylphosphoric triamide ($Me_2N)_3P=O$) giving an overall yield of 65.5% (22.7% α, 42.8% β) and thus an α/β ratio of 1:1.9.

Part D.–1.—Methyl 7-O-methyl-1-thio-α-lincosaminide

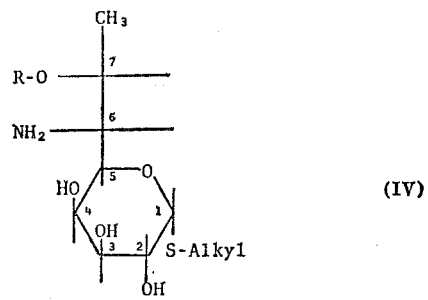

The methyl 7-O-methyl-1-thio-α-lincosaminide-tetraacetate (1.46 gms.) was dissolved in 50 ccs. of hydrazine hydrate and heated under gentle reflux in an oil-bath at 155° C. for 24 hours. Volatile solvent was then removed as completely as possible by distillation at 110° C./15 mm., giving a colorless crystalline residue which was triturated with anhydrous acetonitrile. The solid was removed by filtration and dried. On crystallization from a concentrate of 95% ethanol, 430 mgs. of methyl 7-O-methyl-1-thio-α-lincosaminide hemihydrate (Polymorph I) were obtained as colorless flattened needles, M.P. 126–126.5° C.

*Analysis.*—Calcd. for $C_{10}H_{21}O_5HS \cdot ½H_2O$: C, 43.46%; H, 8.03%; N, 5.07%; S, 11.60%; OMe, 11.23%; M.W. (anhydrous) 267.35. Found: C, 43.63%; H, 8.30%; N, 5.18%; S, 11.67%; OMe, 11.74%. pK a' 7.1.

$[α]_D$: +263° (c., 8284, $H_2O$). M. wt.: (mass spec., M+) 267.

Part D–2

The procedure of Part D–1 was repeated except that the crystallization was effected slowly in a more dilute solution in 95% ethanol. Methyl 7-O-methyl-1-thio-α-lincosaminide hemihydrate was obtained as colorless platelets, M.P. 162–163° C. (Polymorph II).

Both polymorphic forms showed identical chromatographic behavior ($R_f$ 0.2 on silica gel TLC in 1 methanol:15 chloroform by volume). A mixture melting point of forms I and II gave the following:

| | M.P., ° C. |
|---|---|
| I and I | 126–126.5 |
| II and II | 162–163 |
| I and II | 162–163 |

Thus in the presence of Form II, Form I is converted to Form II at some temperature below 162° C.

Part E.—7-O-methyllincomycin Hydrochloride

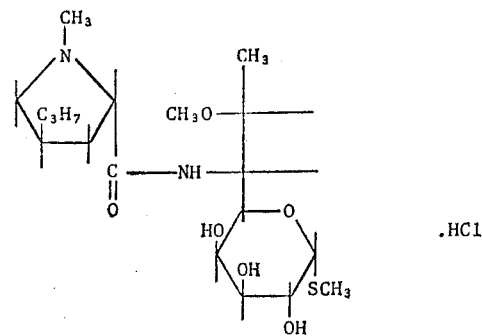

A mixture of 3.08 gms. of 4-trans-propylhygric acid hydrochloride and 75 ccs. of acetonitrile was stirred magnetically in a 3-necked, 500 cc. flask, equipped with a drying tube and a thermometer extending below the liquid surface. On addition of 3.31 gms. of triethylamine, the solid dissolved rapidly to give a pale tan solution.

On cooling to −5° C. in an ice/methanol bath, a colorless precipitate of triethylammonium chloride separated.

Without removal of the precipitate, 2.02 gms. (1.94 ccs.) of isobutyl chloroformate were added at such a rate that the temperature remained below —5° C. and 8° C., after which stirring was continued at —5° C. for 15 minutes.

There were then rapidly added 2.0 gms. of methyl 7-O-methyl-1-thio-α-lincosaminide in 25 ccs. of water to the above mixed anhydride solution, giving a pale tan solution, which was stirred at 0° C. for 45 minutes. Thin-layer chromatography (silica gel, 8 ethyl acetate:5 acetone:1 water by volume) showed a trace only of residual aminosugar, and a major new zone of $R_f=0.4$. Volatile solvent was removed in vacuo at 40° C., the tan aqueous residual solution adjusted to pH 10 by the addition of aqueous sodium hydroxide (N), the mixture extracted thrice with 100 cc. portions of chloroform, and the combined extracts washed with water and dried over anhydrous sodium sulfate. Removal of the sovent in vacuo at 40° C. give a tan amorphous solid (2.32 gms.).

Chromatography on silica gel (450 gms., column dimensions 3.8 x 95 cms.) in the system 1 methanol:15 chloroform by volume following a forerun (250 ccs.) after which 25 cc. fractions were collected automatically, gave 7-O-methyllincomycin in fractions 44–70, inclusive, obtained on removal of the solvent in vacuo as a colorless syrup (2.20 gms.). This syrup was dissolved in water (5 ccs.) by stirring and adding hydrochloric acid (concentrated) to attain a pH of 3, the solution filtered under suction, the sinter washed with water (3 ccs.) and the filtrate and washings cooled in an ice-methanol bath. With stirring, acetone (200 ccs.) was added, followed by ether (100 ccs.), giving a colorless crystalline precipitate which was collected and dried in a vacuum desiccator at room temperature. The solid (1.71 gms.) was obtained as small, elongated, colorless platelets, M.P. 155–157° C.

*Analysis.*—Calcd. for $C_{19}H_{36}O_6N_2S \cdot HCl$: C, 49.93%; H, 8.16%; N, 6.13%; S, 7.02%; Cl, 7.76%; OMe, 6.79%; M.W. (free base) 420.57. Found (corrected for 4.83% $H_2O$) (percent): C, 50.09; H, 8.22; N, 6.02; S, 7.20; Cl, 7.46; OMe, 7.03.

$[\alpha]_D$: +145° (c., 1.063, $H_2O$). pK a': 7.6. M. Wt.: (mass spec., M+ of free base) 420. Antibacterial activity: 2 times lincomycin.

EXAMPLE II

*Part. A–1.—Methyl N-acetyl-2-O-acetyl-3,4-O-isopropylidene-1-thio-α-lincosaminide*

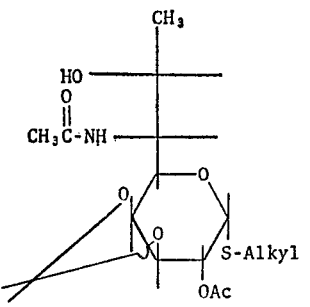

(V)

Methyl 6-N,7,0 - ethylidyne - 3,4 - O - isopropylidene-1-thio-α-lincosaminide (5 gms.) (Example 1C of U.S. Pat. 3,337,527) was acetylated by leaving overnight at room temperature in a mixture of pyridine (25 ccs.) and acetic anhydride (12 ccs.). Removal of solvent on a rotating evaporator in vacuo at 40° C. gave a pale yellow syrup which was dissolved in chloroform, washed with water, saturated aqueous sodium bicarbonate, again with water, and dried over anhydrous sodium sulfate. Thin-layer chromatography (silica gel, 75 methylethyl ketone:25 acetone:10 water by volume) showed the absence of starting material, and the formation of a new zone of slightly higher $R_f$. Removal of the solvent in vacuo at 40° C. gave methyl 2 - O - acetyl - 6N,7 - O - ethylidyne - 3,4 - O - iso- propylidene-1-thio-α-lincosaminide as an almost colorless syrup which could not be induced to crystallize.

Water (75 ccs.) at pH 7 was added and, with magnetic stirring, the mixture was heated on a steam-bath. After 6 hours the solvent was removed in vacuo at 40° C. to give a colorless crystalline solid (5.95 gms.) which was chromatographed on silica (600 gms., column dimensions 4.8 x 79 cms.) in the system 1 methanol:7 chloroform (by volume). After a 650 cc. forerun, 25 cc. fractions were collected automatically, the elution being followed by thin-layer chromatography. The desired material was present in fractions 35–41, inclusive. Removal of the solvent gave a colorless amorphous solid (1.57 gms.). Recrystallization from acetone-Skellysolve B (technical hexane) gave colorless needles of methyl N-acetyl-2-O-acetyl-3,4-O-isopropylidene-1-thio-α-lincosaminide, M.P. 178–179° C.

*Analysis.*—Calcd. for $C_{16}H_{27}O_7NS$ (percent): C, 50.92; H, 7.21; N, 3.71; S, 8.49; M.W. 377.46. Found (percent): C, 50.50; H, 7.20; N, 3.77; S, 8.50.

$[\alpha]_D$: +194° (c., 0.7342, $CHCl_3$). M. wt.: (mass spec. M+) 377.

*Part A–2*

The procedure of Part T–1 was repeated except that the solvent was removed after a heating time of two hours (instead of six hours). The yield of methyl N-acetyl - 2 - O - acetyl - 3,4 - O - isopropylidene - 1 - thio-α-lincosaminide was increased to 60.5%.

*Part B.—Methyl N-acetyl-2-O-acetyl-7-O-methyl-3,4-O-isopropylidene-1-thio-α-lincosaminide*

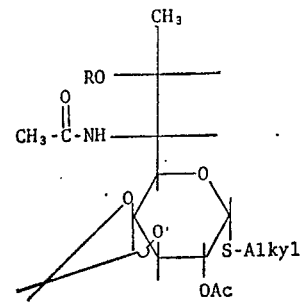

(VI)

Methyl N - acetyl - 2 - O - acetyl - 3,4 - O - isopropylidene-1-thio-α-lincosaminide (1.0 gm., 1 mol.), methyl iodide (37.6 gms., 16.5 ccs., 100 mols.), and silver oxide (3.1 gms., 5 mols.) were heated and stirred under gentle reflux for 16 hours. The methyl iodide was removed in vacuo at 40° C., and the resulting yellow-gray powder was extracted thoroughly with methylene chloride. Removal of the solvent in vacuo gave a yellow syrup (1.09 gms.). This crude product was subjected to countercurrent distribution (500 transfers) in the system 1 ethyl acetate:1 ethanol:1 water:2 cyclohexane, by volume, using equal volumes of upper and lower phase. A major peak was found, of K=0.34, matching the theoretical curve.

Removal of the solvent from the combined fractions of the material of K=0.34 yielded a syrup (250 mgms.) which crystallized on standing. Recrystallization from ethyl acetate-Skellysolve B, gave methyl N-acetyl-2-O-acetyl - 7 - O - methyl - 3,4 - O - isopropylidene - 1 - thio-α-lincosaminide as blunt, colorless needles, M.P. 152–154° C. (160 mgms.). A second recrystallization from the same solvent mixture yielded the pure product, M.P. 153.5–154° C.

*Analysis.*—Calcd. for $C_{17}H_{29}O_7NS$ (percent): C, 52.15; H, 7.47; N, 3.58; S, 8.19; M.W. 391.48. Found (percent): C, 52.24; H, 7.48; N, 3.92; S, 7.98.

M. wt.: (mass spec., M+) 391. $[\alpha]_D$: +188° (c., 1.185, $CHCl_3$).

Part C.—Methyl N-acetyl-7-O-methyl-1-thio-α-lincosaminide and its triacetate

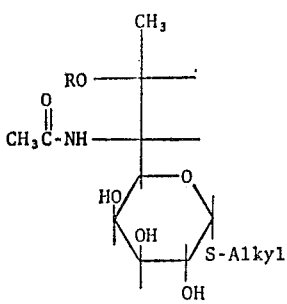

(VIII)

Methyl N - acetyl - 2 - O - acetyl - 3,4 - O - isopropylidene-1-thio-α-lincosaminide (100 mgms.) was stirred with water (20 ccs.) and aqueous hydrochloric acid (N, 5 ccs.) at room temperature overnight. The solution was neutralized by stirring with silver carbonate (3 gms.), the solids removed by filtration and washed with water, and the filtrate and washings taken to dryness on a rotating evaporator at 60°/7 mm., giving methyl N-acetyl-7-O-methyl-1-thio-α-lincosaminide as a colorless syrup which did not crystallize. It was further characterized by converting it to the triacetate.

Pyridine (5 ccs.) and acetic anhydride (3 ccs.) were added, the mixture swirled till the syrup had dissolved, and the mixture left overnight at room temperatre. Solvent was then removed as completely as possible at 40° C./<1 mm., giving a tan crystalline mixture, which was dissolved in chloroform, washed with aqueous hydrochloric acid (N/10), water, saturated aqueous sodium bicarbonate, water, and dried over anhydrous sodium sulfate. Removal of the solvent in vacuo gave methyl N-acetyl-2,3,4-tri-O-acetyl-7-O-methyl - 1 - thio-α-lincosaminide as an almost colorless crystalline solid which separated from ethyl acetate-Skellysolve B in small colorless prisms, M.P. 211.5–213° C.

*Analysis.*—Calcd. for $C_{18}H_{19}O_9NS$: C, 49.64%; H, 6.71%; N, 3.22%; S, 7.36%; MeO, 7.13%; M.W. 435.49. Found (percent): C, 49.72; H, 6.77; N, 3.36; S, 7.27; MeO, 7.08.

$[\alpha]_D$: +229° (C., 0.7174, $CHCl_3$). M. wt: (mass spec., M+) 435.

In place of methyl iodide, there can be substituted ethyl, propyl, butyl, isobutyl, sec.butyl, and tert-butyl iodide to produce the corresponding 7-O-lower alkyl analogs.

In place of 4-propylhygric acid hydrochloride (1-methyl - 4 - trans-propyl-L-2-pyrrolidinecarboxylic acid hydrochloride) there can be substituted the hydrochlorides of other L-2-pyrrolidine carboxylic acids of the formula

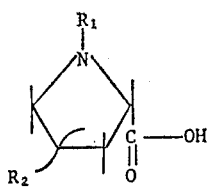

wherein $R_1$ is hydrogen or lower alkyl, for example, methyl and ethyl, and $R_2$ is hydrogen; lower alkyl, for example, methyl, ethyl, propyl, butyl, pentyl, hexyl, heptyl, and octyl, and the isomeric forms thereof; or lower cycloalkyl, for example, cyclopentyl, cyclohexyl, and cyclohexylmethyl to give compounds of the following formula

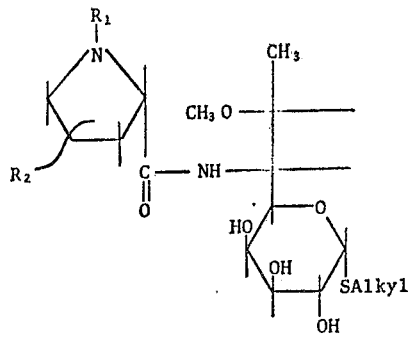

wherein Alkyl, $R_1$, and $R_2$ are as given above.

Compounds of particular significance that can thus be produced are those in which Alkyl is methyl or ethyl and (1) $R_1$ is hydrogen and $R_2$ is pentyl; (2) $R_1$ is hydrogen and $R_2$ is propyl; (3) $R_1$ is methyl and $R_2$ is methyl and $R_2$ is pentyl. These compounds can be obtained as cis or trans isomers or mixtures of the two.

I claim:
1. A process for making compounds of the formula

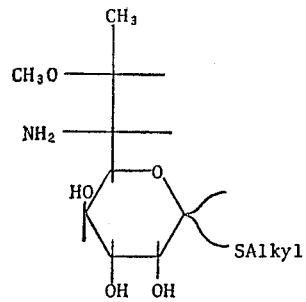

which comprises reacting a compound of the formula

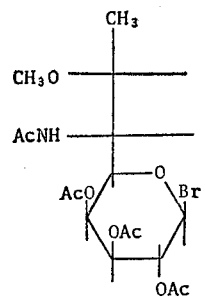

with thiourea in a tertiary amide dipolar aprotic solvent to form the isothiouronium salt

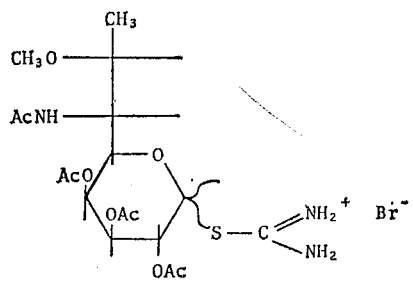

subjecting the isothiouronium salt thus formed to mild alkaline hydrolysis to form the thiose

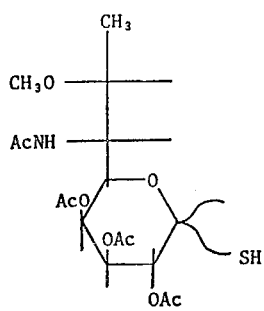

alkylating the thiose thus formed to form a thioglycoside of the formula

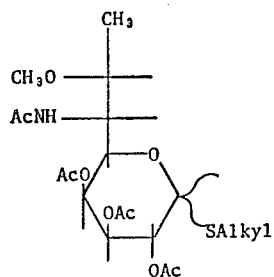

and removing the protective groups Ac, Alkyl being alkyl of not more than 4 carbon atoms and Ac being a protective carboxacyl group.

2. A process for making compounds of the formula

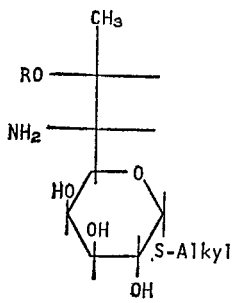

which comprises opening by uncatalyzed hydrolysis the oxazoline group of a compound of the formula

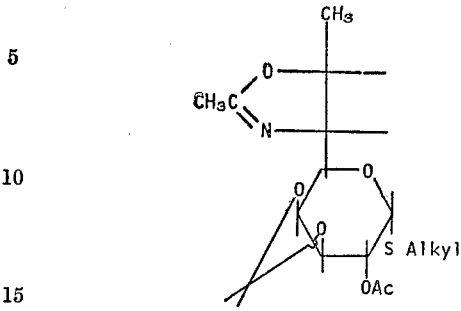

wherein Ac is a protective carboxacyl group and alkyl is lower alkyl, alkylating to form a compound of the formula

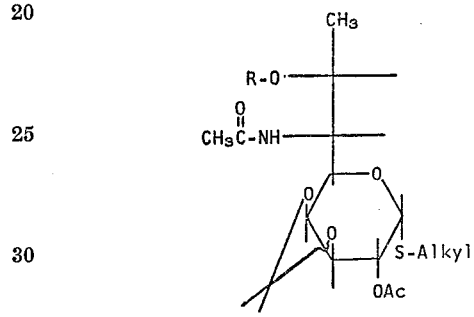

wherein R is lower alkyl and thereafter removing the

group by hydrazinolysis and the 3,4-O-isopropylidene group by acid hydrolysis.

3. Methyl 7-O-methyl-1-thio-α-lincosaminide hemihydrate colorless platelets having a melting point of about 162–163° C.

4. Methyl 7-O-methyl-1-thio-α-lincosaminide hemihydrate in the form of colorless flattened needles having a melting point of about 126–126.5° C.

References Cited

UNITED STATES PATENTS 3,337,527  8/1967  Bannister et al. _____ 260—210
3,380,992  4/1968  Argoudelis et al. _____ 260—210

LEWIS GOTTS, Primary Examiner

J. R. BROWN, Assistant Examiner

U.S. Cl. X.R.

260—999

UNITED STATES PATENT OFFICE
CERTIFICATE OF CORRECTION

Patent No. 3,574,187                    Dated April 6, 1971

Inventor(s) Brian Bannister

It is certified that error appears in the above-identified patent and that said Letters Patent are hereby corrected as shown below:

Column 3, line 35, "isopropyidine" should read --isopropylide
line 42, "3,4-O-1-isopropylidene" should read --3,4-O-isoprop
idene--. Column 6, line 9, "an" should read --on--. Column
line 10, "(IV)" should read --I--; line 31, "(c., 8284, $H_2O$).
should read --(c, 0.8284, $H_2O$)--. Column 9, line 3, "below"
should read --between--; line 62, "6-N,7,O-" should read
-- 6-N,7-O- --. Column 10, line 23, "Part T-1" should read -
A-1--. Column 12, line 24, "$R_1$ is methyl and $R_2$ is methyl an
is pentyl" should read --$R_1$ is methyl and $R_2$ is pentyl--. Co
14, line 41, "hemihydrate colorless platelets" should read
--hemihydrate in the form of colorless platelets--.

Signed and sealed this 7th day of September 1971.

(SEAL)
Attest:

EDWARD M. FLETCHER, JR.
Attesting Officer

ROBERT GOTTSCHALK
Acting Commissioner of Pat